Dec. 12, 1972  H. STAEUDLE  3,706,093
RANGE FINDER
Filed June 1, 1970  3 Sheets-Sheet 3
Fig. 3
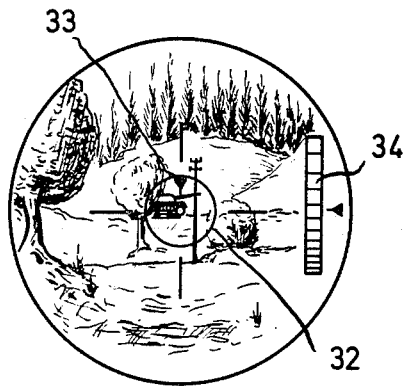
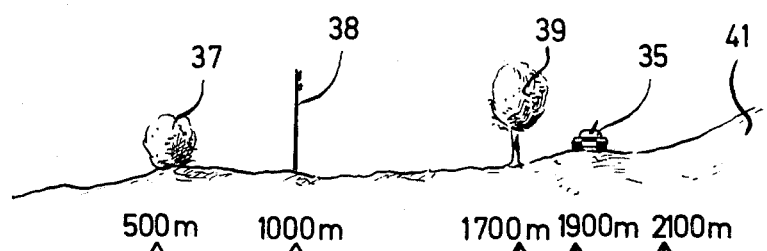
Fig. 4a
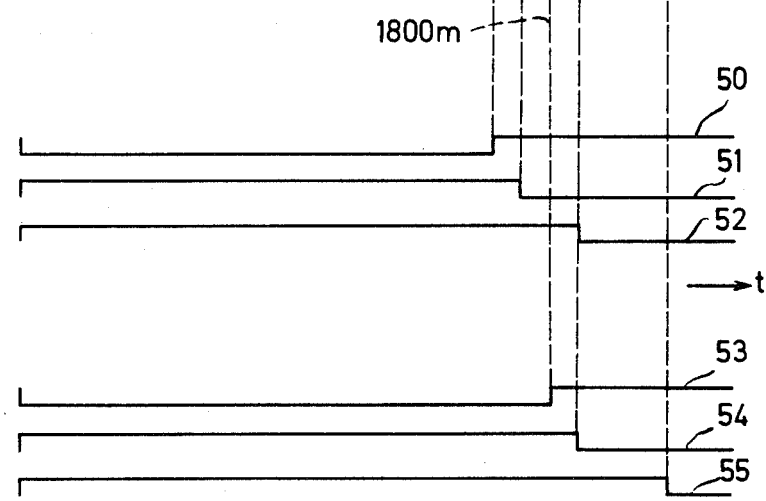
Fig. 4b
Fig. 4c
Fig. 4d
INVENTOR
HANS STAEUDLE
BY
Sandoe, Hopgood & Calimafde
ATTORNEYS 3,706,093
RANGE FINDER
Hans Staeudle, Heidenheim-Schnaitheim, Germany, assignor to Carl Zeiss Stiftung, doing business as Carl Zeiss, Wuerttemberg, Germany
Filed June 1, 1970, Ser. No. 42,143
Claims priority, application Germany, June 3, 1969,
P 19 28 274.7
Int. Cl. G01c 3/08; G01s 9/00
U.S. Cl. 343—6 R                    13 Claims

ABSTRACT OF THE DISCLOSURE

The invention contemplates coordinated optical and echo-ranging range finders on the same directional alignment whereby echo-range data may be available to improve the range setting of the optical range finder, for high-quality ranging in the presence of masking objects. Conversely, the improved resolution achieved by visual ranging can be utilized to up-grade the selection of the particular echo (among a spread of masking echoes) for which a range determination is to be measured by the echo-ranging range finder. Various specific coordinating relationships are described for the two range finders.

---

For measuring distances within the visibility range it has long been known to use range finders of various types. As an example we mention here only split image, stereoscopic, and inverted-image range finders.

With optical range finders it is possible to measure even a partly hidden target without the measuring result becoming ambiguous. The measuring accuracy of the optical range finders is limited, however. Thus, for example, in the stereoscopic range finder the measuring accuracy is limited by the so-called minimum error, which is a function of the range to be measured.

Known are also range finders which are based on the measurement of the transit time of pulses. In these range finders, an impulse is emitted and the transit time between the emission and the reception of the pulse reflected on the target is measured. The transit time thus determined is a direct and very accurate measure of the range to be measured.

For some years, laser range finders have been known where a laser is used to generate a pulse. The measuring accuracy of such a range finder depends substantially on the frequency used for the time measurement and it can be relatively high. In measuring a partly hidden target, however, echoes of the emitted impulse appear, since any object that covers the target partly emits an echo. The reading is thus ambiguous, and the user must decide which of the indicated ranges he has to associate with the target.

It is an object of the present invention to provide a range-finder assembly which permits a very rapid and accurate measurement of the range without the measuring result being ambiguous in the case of partly hidden targets.

The range-finder assembly according to the invention is characterized by the functional coupling of an optical range finder and of an echo-ranging device, such as a range finder based on the measurement of the transit line of pulses. Due to this coupling it is possible to utilize the advantages of both types of range finders without having to put up with their disadvantages.

In the new range-finder assembly, the measuring instrument of the optical finder is coupled in a very advantageous manner with an arrangement for producing an electrical quantity proportional to the determined range, and this arrangement is connected with a gate which interrupts the connection between the receiver and the transit-time meter of the transit-time range finder, after emission of each pulse and during a period proportional to the electrical quantity. Due to this measure, undesired pulse-echoes are eliminated, which are caused by objects located between the range finder and the target to be measured.

Thus, in the new range finder assembly, the optical range finder provides a first or coarse measurement, while the fine measurement is effected with the echo-ranging or transit-time range finder.

The gate between the receiver and the transit-time meter of the transit-time range finder, which is influenced by the optical range finder, is closed during the emission of each pulse and is opened again only after a period which corresponds to the range measured by the optical range finder. In this way, it is possible to eliminate the "noise" or masking effect of any echo originating from objects located between the range finder and the target. But in order to ensure in any case that the target will be positively picked up even if the target is somewhat inaccurately measured in the optical range finder, the arrangement is so selected that the gate opens about 10 percent earlier in time than would correspond to the optically measured range.

Preferably, a follow-up device or tracking mechanism interconnects the transit-time meter of the transit-time range finder and the measuring instrument of the optical range finder; such tracking mechanism drives the range setting of the optical range finder until zero balance is achieved, i.e., until the optically set range matches the time-measured distance for the desired echo. In order to permit such an absolutely reliable target pickup, the transit-time meter of the transit-time range finder contains several time-measuring elements for measuring the range values respectively corresponding to each of several different echoes in the selected field. It must be pointed out explicitly that these measured pulse echoes are in the immediate proximity of the target, that is, the above-described advantages of the new range finder are preserved in this design too.

Between the transit-time meter and the follow-up device is arranged a switch for selecting a particular one of the several transit-time measuring elements, thereby enabling selection of the echo of interest. The quantity selected with this switch serves as a guide quantity for the follow-up device so that the optical range finder is adjusted until it shows the same range as the transit-time range finder. The viewer sees a measuring mark move during the follow-up operation and, if the measuring mark does not come to a stop above the target to be measured, he can select another setting of the switch between the transit-time meter and the follow-up device. The optical range finder is thus set to the target corresponding to the adjacent pulse echo, which the viewer can observe again.

In the above-described measuring operation, it is possible to pick up a target in a very short time and without ambiguity of the reading, and to measure the distance to this target very accurately.

It is of advantage to combine with the measuring instrument of the optical range finder an arrangement connected with the receiver of the transit-time range finder, serving to regulate receiver gain in accordance with the optically determined distance setting. Such regulation ensures that the receiver is not overmodulated by echoes from near targets; overmodulation would otherwise considerably reduce the resolution of the transit-time range finder, so that in the case of two targets, for example, which are close in proximity, one behind the other, the second echo would be masked, and only the first echo would be indicated.

The foregoing and further objects and features of the invention will be pointed out or will occur to those skilled in the art from a reading of the following specification in connection with the accompanying drawings. In said drawings, which show, for illustrative purposes only, a preferred form of the invention:

FIG. 3 is a diagram to illustrate a typical field of view to the operator of the range finder; and FIG. 4 is a composite side view of objects and ranges in the field of view of the terrain corresponding to FIG. 3, showing at (a) the objects themselves, at (b) the ranges of the respective objects, and at (c) and (d) the electrically gated range times or periods for each of two selected gate operations.

Figure 1:
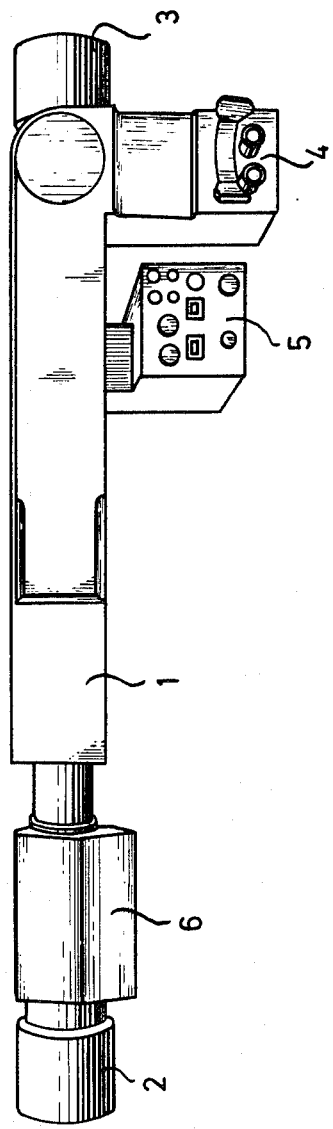
FIG. 1 is a perspective view of an embodiment of the new range finder.

FIG. 1 illustrates the invention in application to an optical stereoscopic range finder 1, having two objective lens heads 2–3 and eye-viewing lens means 4. Directly adjacent to the operator is a control desk 5, and a directional transit-time range finder 6 is bodily integrated to or carried by the range finder 1. The optical range finder 1 also serves as a sighting telescope for the transit-time range finder 6, it being understood that the two finders are in substantial directional alignment.

Figure 2:
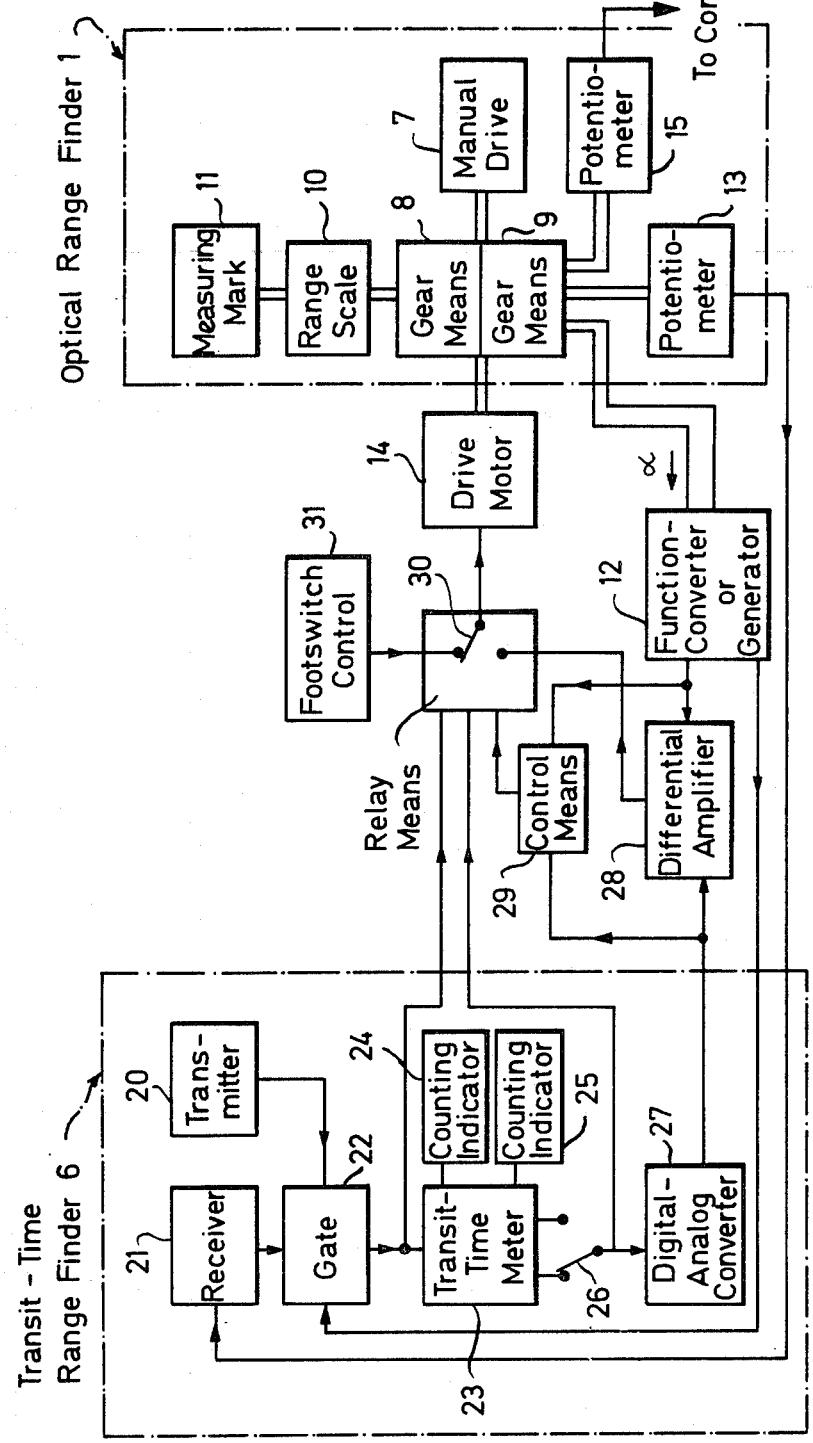
FIG. 2 is a block diagram schematically showing mechanical parts and electrical circuits of the new range finder.

In the schematic representation of FIG. 2, 7 denotes the manual drive of the stereoscopic range finder 1. This manual drive operates gear means 8–9. The gear means 8 moves the range scale 10 and the measuring mark 11, it being understood that the relative position of the mark 11 against the scale 10 is always indicative of the instantaneous range setting of the optical range finder 1. The gear means 9 is connected mechanically with a function converter or generator 12. Due to the principle of the stereoscopic range finder, the instantaneous value of the angle α between the spaced stereoscopic viewing axes is available as an input quantity for the converter 12; this quantity is proportional to $1/E$, where E denotes the range to intersection of the stereoscopic viewing axes. This input quantity may be mechanically converted to an output quantity using a function gear, but it is preferred at 12 to employ an electronic circuit, generating an electrical quantity directly proportional to the range E. This output quantity or signal is fed to the gate 22 of the transit-time range finder 6, which also includes a transmitter 20, a receiver 21 and a transit-time meter 23.

The transit-time meter 23 has two range indicators 24–25, and its output is connected with a suitable converter 27, preferably over an electronic switch 26 by which a particular one (to the exclusion of the other) of range indicators (e.g., at 24 or 25) is picked off for control purposes. The voltage or other electrical-quantity output supplied by this converter is supplied to a follow-up or differential amplifier 28, having at the same time a second input responsive to the voltage or other electrical-quantity output of the function converter 12. If the two voltages (or output quantities) presented to the inputs of follow-up amplifier 28 are not equal, switch or relay 30 is actuated through a suitable control relay 29, thereby applying the output of amplifier 28 to a motor 14, for driving the stereoscopic range finder 1 to a corrected optical-range setting.

For periods when the optical range-finder setting is not slaved to the echo-ranging equipment, a foot switch 31 may operate motor 14 to set the stereoscopic range finder.

Connected with the gear means 9 of the stereoscopic range finder 1 is a potentiometer 15 whose output is connected with a computer, as for gun-elevation control.

The method of operation of the new range finder will be described below more fully in conjunction with FIGS. 2 to 4.

FIG. 3 depicts the field of view and display that presents itself to the operator when looking into the eyepiece or viewer 4 of the stereoscopic range finder 1. A superposed inner circle or reticle 32 indicates the effective diaphragm aperture (or directional-response field) for the receiver 21 of the transistor-time range finder. 33 denotes the instantaneous time-measured mark (i.e., the instantaneous boresight alignment of the echo-ranging axis), and the range scale of the optical range finder is displayed at 34.

In the situation represented in FIG. 3, several objects are inside the diaphragm aperture 32 of the receiver 21. All these objects supply echoes, with masking effects, so that it is not possible to measure distance to the desired target with the transit-time range finder alone.

During the measurement, azimuth and elevation of the range finder assembly of FIG. 1 are aimed until the pointer of the time-measuring mark 33 coincides with the desired target, e.g., the tank 35, and a first approximation of range setting is made with the optical range finder 1, via the hand drive 7 or by foot-operation 31 of the motor 14. With this setting, the amplification of the receiver 21 is automatically regulated over the potentiometer 13. At the same time, the gate 22 is so set by the function converter 12 that it suppresses all pulse echoes which originate from objects that are within the optically measured range.

The operator then presses the corresponding button at the control console 5, to release or transmit an impulse of the transit-time range finder 6. The transistor-time range finder preferably contains a laser for the generation of impulses, and the laser forms part of the transmitter 20.

The impulse emitted by transmitter 20 covers the distance to the target 35, is reflected there, and produces in the receiver 21 an echo signal, designated 36 in FIG. 4b.

With the emission of the laser impulse, the gate 22 is blocked. This blocking is maintained, as shown in curve 50 in FIG. 4c, for a period which corresponds to the transit time of the laser impulse from the range finder, to the optically measured target, and back to the range finder. As mentioned above, the actual blocking time differs from this transit time by about 10 percent.

If we assume in a first example that the optical range finder indicates a value of 1800 meters, the pulse echoes formed on the bush 37 and on the post or pole 38 are blocked from reception by the receiver 21 of the transit-time meter, as shown in curve 50. However, the transit-time meter does receive pulse echoes 40, 36 and 42, caused by the tree 39, by the tank 35, and by the slope 41. The transit-time meter 23 operates two counting-type measuring elements. The counters of these measuring elements begin to run when the laser impulse is emitted. When the first received pulse echo is passed by the gate 22, a first counter 24 is stopped, to indicate the range 1700 m., as suggested in curve 51 by the chronological span to the step of FIG. 4c. The counter of the second measuring element 25 responds to the second gated echo and is seen in curve 52 to be stopped when the pulse echo 36 arrives, thus indicating the range 1900 m.

When the switch 26 is in the left position, as shown in FIG. 2 for the normal, or at-rest condition, the digital-analog converter 27 generates an analog voltage which corresponds to the range 1700 m. At th output of the function converter or generator 12, a voltage is generated, corresponding to the optically measured range 1800 m. The resulting voltage difference is sufficient to operate the switch 30 via the control means or relay 29, to actuate switch 30 to its bottom position. The differential amplifier 28 is thus connected with the motor 14, and the latter is supplied with voltage until the stereoscopic range finder indicates a range of 1700 m. When that condition is reached, a null or balance is achieved, and the voltage 51 of FIG. 4c has effectively reset the gate 22.

In the above-described adjustment of the range finder to the range value of 1700 m., the operator sees the measuring mark 33 "move forward" during the follow-up process and stop above the tree 39, that is, on an undesired target. He therefore reverses the switch 26, that is, he brings into the right-hand position, in which case, the converter 27 produces a voltage which corresponds to the range of 1900 m., indicated at 52. Since the optical range finder is set to 1700 m., the switch 30 is again actuated to its bottom position, and the measuring mark 33 appears to be driven by motor 14 until the optical range finder also indicates the value 1900 m. During the follow-up process (i.e., drive by output from differential amplifier 28), the viewer sees the measuring mark 33 "move to the rear" and stop above the tank 35.

A voltage analogous to the measured range is fed via the potentiometer 15 to a computer, for various output purposes, as for example, to determine and set the correct angle of elevation of a gun barrel.

In a second measuring example, it is assumed that the optical range finder indicates a range of 2000 m. The resulting blocking time for the gate 22 is suggested by curve 53 of FIG. 5d, i.e., its step is at the 1800 m. ranging distance, representing 2000 m., less 10 percent. In this circumstance, only the pulse echoes 36 and 42 reach the transit-time meter 23, and at counters 24 and 25 the values 1900 and 2100 are indicated, as shown by the curves 54 and 55. When the switch 26 is in the left position, as shown, the optical range finder is driven in the described manner by the voltage output of amplifier 28 until the optical range finder indicates the value 1900 m. The operator sees the measuring mark 33 "move" to the front and stop above the tank 35. He knows that he has now measured the correct target, and he can save himself the trouble of reversing the switch 26 to make the second adjustment approach.

The reversing switch 30 is preferably of the electronically actuated variety; it returns to its normal upper contact, connecting motor 14 to the foot control 31, as soon as the transit-time range finder and the optical range finder have been balanced.

Switch 30 switches to its lower or "make" contact either when a range is measured with the laser or an echo is received, or when the selector switch 26 is operated.

It may be of advantage to feed the range values obtained in the range measurement, directly and in digital form, from the transit-time range finder, and via a storage device to the computer. The computer ensures that, if the device fails, the last-measured value is preserved.

It may also be of advantage, in certain cases, to use an encoder in the optical range finder as a measured-value transmitter; such an encoder would use the same code as the transit-time range finder, but it is so designed that (1/E)-to-(E) conversion is effected at the same time. The digital values obtained with it can be stored and fed over a reversing switch to the computer. In this case, the measuring mark is moved to the value measured by the transit-time range finder by feeding the digital values directly to a digital follow-up circuit.

What is claimed is:

1. Range-finder means, consisting of a directional optical range finder including means responding to the instantaneous range setting thereof and producing an electrical quantity proportional thereto, a directional pulse-transmitting echo-ranging second range finder directionally aligned with said optical range finder and including a time-based display of received echoes within a given range, and means coupling the electrical quantity produced by said optical range finder to said second range finder such that pulse-echoes caused by objects located within the instantaneous range setting of the optical range finder are suppressed in said display.

2. Range-finder means according to claim 1, in which said second range finder includes an adjustable gate limiting the time bracket within which echoes are presented in said display, said gate being adjustable in accordance with the range setting of said optical range finder.

3. Range-finder means according to claim 2, in which said second range finder includes plural time-measuring circuits, one of which is operative to determine time until reception of the first echo after blanking, and a second of which is operative to determine time until reception of the second echo after blanking.

4. Range-finder means according to claim 3, in which each time-measuring circuit is of the variety storing an electrical-quantity output reflecting its measured-range value.

5. Range-finder means according to claim 4, and including switch means for selecting the stored output of one to the exclusion of other of said time-measuring circuits, and means differentially evaluating said optical-range and selected time-measured electrical-quantity outputs for adjusting the optical-range setting in the directional sense reducing the difference between said outputs.

6. Range-finder means according to claim 1, in which said echo-ranging range finder includes means producing an electrical quantity proportional to the instantaneously determined range of a particular echoing target, and means for adjusting the range setting of said optical range finder in accordance with the instantaneous difference between said electrical quantities.

7. Range-finder means according to claim 6, in which said last-defined means includes a null-seeking motor drive to the range setting of said optical range finder.

8. Range-finder means according to claim 1, in which each of said range finders includes means producing an electrical output in digital form, respectively reflecting instantaneous optical-range and echo-range determinations, and means differentially evaluating said digital outputs for adjusting the optical-range setting in the directional sense which reduces the difference between said outputs.

9. Range-finder means according to claim 1, in which said second range finder includes a pulsed laser.

10. Range-finder means according to claim 1, in which said optical range finder includes viewer means visually displaying the field of view thereof, and range-scale display means effectively superposed on the visual display field of said viewer means, said range-scale display means being responsive to the output of said echo-ranging range finder.

11. Range-finder means according to claim 1, in which said optical range finder includes a telescopic sighting element in substantial alignment with the directional alignment of said echo-ranging range finder.

12. Range-finder means according to claim 1, in which said optical range finder is of the stereoscopic variety, including two horizontally spaced viewing axes.

13. Range-finder means, comprising a directional optical range finder including a viewer with a measuring mark to be seen by the operator in his field of view when he views a target for which distance is to be measured, means responding to the instantaneous range setting of said finder and producing an electrical quantity proportional thereto, a directional echo-ranging second range finder having a directional response that is more limited than the field of view of said optical range finder, said directional response being aligned within the field of said optical range finder and said measuring mark being coordinated with said directional response in respect of the optically viewed field, said echo-ranging range finder being based on measurement of the transit time of pulses emitted by said second range finder and reflected back by said target, means coupling the electrical quantity produced by said optical range finder to said second range finder such that pulse-echoes which are caused by objects located between the optical range finder and said target measured by it are eliminated, and follow-up means controlled by said second range finder for adjusting the optical range finder until said measuring mark substantially registers with the viewer display of the target measured by said second range finder.

References Cited
UNITED STATES PATENTS
| | | | |
|---|---|---|---|
| 3,020,538 | 2/1962 | Teiling et al. | 343—7.3 |
| 2,234,329 | 3/1941 | Wolff | 356—5 |
| 3,402,630 | 9/1968 | Blau et al. | 356—5 |
| 3,075,189 | 1/1963 | Lisicky | 343—7.3 |
| 3,409,368 | 11/1968 | Fernandez | 356—5 |
| 3,344,421 | 9/1967 | Dildy, Jr. | 343—7.3 |

BENJAMIN A. BORCHELT, Primary Examiner

S. BUCZINSKI, Assistant Examiner

U.S. Cl. X.R.

343—6 ND; 356—5